United States Patent
Baumeister et al.

(10) Patent No.: US 11,780,334 B2
(45) Date of Patent: Oct. 10, 2023

(54) CONTROL OF THE ACTIVE DISCHARGE OF A HIGH-VOLTAGE INTERMEDIATE CIRCUIT

(71) Applicant: AUDI AG, Ingolstadt (DE)

(72) Inventors: Thomas Baumeister, Ingolstadt (DE); Stephan Brüske, Ingolstadt (DE); Simon Haussmann, Nürtingen (DE); Jochen Heusel, Reutlingen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/366,478

(22) Filed: Jul. 2, 2021

(65) Prior Publication Data

US 2022/0089032 A1    Mar. 24, 2022

(30) Foreign Application Priority Data

Sep. 24, 2020    (DE) .......................... 102020124869.5

(51) Int. Cl.
| | |
|---|---|
| *B60L 3/00* | (2019.01) |
| *B60L 50/60* | (2019.01) |
| *H02M 1/00* | (2006.01) |
| *H02M 1/36* | (2007.01) |
| *B60L 3/04* | (2006.01) |
| *H02H 9/04* | (2006.01) |

(52) U.S. Cl.
CPC .............. *B60L 3/04* (2013.01); *H02H 9/041* (2013.01); *B60L 2210/42* (2013.01)

(58) Field of Classification Search
CPC ...... B60L 3/04; B60L 2210/42; B60L 3/0046; B60L 50/60; H02H 9/041; Y02T 10/70; H02M 1/32
See application file for complete search history.

(56) References Cited

U.S. PATENT DOCUMENTS

| | | | |
|---|---|---|---|
| 9,729,044 B2 * | 8/2017 | Ishino ..................... | H02M 1/34 |
| 2013/0234510 A1 * | 9/2013 | Nakamura ............ | B60L 3/0007 |
| | | | 307/10.1 |

FOREIGN PATENT DOCUMENTS

| | | | | |
|---|---|---|---|---|
| CN | 102859857 A | 1/2013 | | |
| CN | 106533141 A | 3/2017 | | |
| CN | 110912385 A | 3/2020 | | |
| CN | 110920398 A | 3/2020 | | |
| DE | 102012020019 A1 | 4/2014 | | |
| DE | 102018115295 A1 * | 1/2020 | .............. | B60L 15/04 |
| DE | 102018115295 A1 | 1/2020 | | |
| WO | 2019039047 A1 | 2/2019 | | |

OTHER PUBLICATIONS

German Examination Report dated May 3, 2021 in corresponding German Application No. 102020124869.5; 12 pages; Machine translation attached.
Office Action dated Jul. 4, 2023, in corresponding Chinese Application No. 202110784319.8, 14 pages.

* cited by examiner

*Primary Examiner* — Elim Ortiz
(74) *Attorney, Agent, or Firm* — Maier & Maier, PLLC

(57) ABSTRACT

A method and a device for controlling the active discharge of a high-voltage intermediate circuit via a discharge resistor.

20 Claims, 1 Drawing Sheet

CONTROL OF THE ACTIVE DISCHARGE OF A HIGH-VOLTAGE INTERMEDIATE CIRCUIT

FIELD

The invention relates to a method and a device for controlling the active discharge of a high-voltage intermediate circuit via a discharge resistor.

BACKGROUND

Within a high-voltage on-board network of electric vehicles, the capacitive intermediate circuit of the HV components (e.g. traction inverter) must be discharged after the HV voltage has been switched off by disconnecting the HV battery from the rest of the on-board network using contactors. This must be done each time the HV system is switched off and also in special cases, e.g. when a crash is detected. Normally, the intermediate circuit is charged to the current battery voltage, which in current configurations is in a voltage class of up to 800 V and, depending on its capacity, contains a high amount of energy.

The intermediate circuit is usually discharged via a passive discharge circuit and, in addition, an actively controllable discharge circuit. The circuit for active discharge is used to rapidly discharge the capacitors in the HV DC circuit and to lower the voltage below a specified voltage within a specified time. Usually, a discharge to a residual voltage of less than 60 V (permissible contact voltage) is required within 2 s after the HV voltage has been switched off. After an electronic switch (eg MOSFET or IGBT) has been switched on, the capacitively stored energy is converted into heat by the resistor circuit, with the voltage dropping exponentially.

If the discharge resistors are switched on permanently, the entire energy is impressed into the resistor, without phases of thermal relaxation. In addition, after switching on the discharge resistor, a relatively large pulse power is generated for a period in the multi-digit millisecond range, which, depending on the voltage and resistance, can be in the kW range. The discharge resistors must therefore be designed to be particularly pulse-proof and have a sufficiently large heat capacity to not to be thermally overloaded. This has a direct influence on the size or the number of parallel or serially connected discharge resistors and also on their thermal connection to a heat sink.

If the discharge resistor is implemented with surface-mounted resistors (SMD resistors), a resistor network is necessary that takes up a large amount of circuit board area. According to the specification, pulse powers from over several hundred watts up to kW are often only permissible for a duration in the μs range with SMD resistors. Alternatively, a massive resistor (e.g. a wire-wound power resistor) is required, which is designed as a push-through assembly component (THT component) or an external resistor that is connected to the circuit board by a plug connection.

If the discharge network remains connected to the energy source, the discharge resistor must be switched off again. By switching the discharge resistor on and off, it can already experience a significant temperature increase. As a result, sufficiently long pauses are necessary between the discharging attempts. Since the voltage must be reduced to a value below the threshold value within 2 s after opening the battery contactors, the time available for the actual discharge can in the worst case be reduced by the preceding pause. The resistance value of the discharge circuit is therefore designed in such a manner that sufficient voltage reduction is ensured in less than 2 s.

Since it cannot be ruled out that the battery contactors are already fully open when the active discharge is activated, a discharge against the HV battery can also occur. In order to protect the discharge circuit from thermal overload, the HV DC voltage is measured in the system, the detected voltage drop is evaluated and, if necessary, the discharge circuit is deactivated.

From CN 110912385 A, an active discharge circuit is known which comprises a DC-DC converter, which is used to convert electrical high-voltage energy into electrical low-voltage energy, a first discharge branch and a second discharge branch connected to the output of the DC-DC converter are connected, wherein the first discharge branch is used to transfer the electrical energy output by the DC-DC converter to the low-voltage battery, and the second discharge branch is used as a load in order to consume the electrical energy output by the DC-DC converter.

WO 2019/039047 A1 discloses a power converter which prevents excessive power from being input into a discharge resistor in the event of a rapid electrical discharge of the power converter, and a method for controlling the power converter. The power converter is provided with: a capacitor connected in parallel to an inverter circuit; a discharge circuit in which a discharge resistor and a switching element connected in parallel to the capacitor are connected in series; and a control circuit that controls the electrical discharge of the capacitor through the discharge resistor by controlling the switching element. The control circuit changes a pulse duty factor of the switching element at the time of the electrical discharge of the capacitor.

A device for electric vehicles is apparent from US 2013/234510 A1 which comprises an inverter and a smoothing capacitor, which are connected in parallel to a high-voltage supply. A quick discharge resistor and a discharge switch element are connected in parallel to the smoothing capacitor, and a control device controls the discharge switch element. The control device controls the switching of the discharge switch element such that, in response to a command to discharge quickly, a pulse duty factor increases as the voltage at both ends of the smoothing capacitor decreases.

SUMMARY

Against this background, the invention has been based on the problem of providing a device and a method with which a circuit for an active discharge of an HV intermediate circuit without THT components on the circuit board ensures rapid discharge of the high-voltage intermediate circuit while thermal overload of the discharge resistors can be prevented.

The subject matter of the invention is a device for actively discharging a high-voltage intermediate circuit contained in a power electronics module for providing an operating voltage for an electric drive machine of an electrically powered vehicle with an intermediate circuit capacitor, which device comprises a control device for controlling the active discharge and a discharge circuit that can be actuated by the control device for actively discharging the high-voltage intermediate circuit, which has a semiconductor switch and a discharge resistor connected in series thereto, characterized in that the discharge resistor is made up of an SMD resistor or multiple SMD resistors, and in that the control device is set up for the active discharge to actuate the semiconductor switch with a pulse width modulated signal, wherein the frequency and the pulse duty factor of the pulse width modulated signal at the beginning of the active discharge are selected such that the semiconductor switch is closed for no longer than 10 µs, and the pulse duty factor of the signal is then increased depending on the current voltage level of the high-voltage intermediate circuit such that a power loss is generated at the discharge resistor over the duration of the active discharge, which comes as close as possible to a maximum permissible power loss of the discharge resistor but does not exceed it, and in that the power loss is distributed more evenly over the entire discharge period than with a constant pulse duty factor. In one embodiment, the control device is set up to keep the power loss at the discharge resistor in a range from 70 to 100% of the maximum permissible power loss of the discharge resistor, for example, in the range from 80 to 100%, or even from 90 to 100%.

In one embodiment, the control device is set up to vary both the pulse duty factor of the signal and its frequency as a function of the instantaneous voltage level of the high-voltage intermediate circuit. This allows the switch-on time and the cooling time of the discharge resistor to be controlled independently of one another. In addition, this enables more flexible control of the switch-on time of the discharge resistor than by simply varying the pulse duty factor in discrete steps.

In order to distribute the thermal load caused by the discharge process more evenly over the duration of the discharge, the electronic switch is activated in a timed manner instead of a permanent connection of the discharge resistor, and thus the discharge path is switched on and off at high frequencies. For this purpose, the frequency and the pulse duty factor of the pulse width modulated signal at the beginning of the active discharge are selected such that the semiconductor switch is closed for no longer than 10 microseconds. For example, the discharge process can be started at a switching frequency of 100 Hz and an initial pulse duty factor (start-pulse duty factor) of 1%, which results in a switch-on time of the semiconductor switch ($T_{on}$) of 1 µs. In addition, the pulse duty factor is increased depending on the current HV voltage in the intermediate circuit, with the aim of controlling the power dissipation at the discharge resistor such that the discharge time is as short as possible without exceeding the maximum permissible power dissipation of the discharge resistor. Due to the clocked actuation and the resulting lower thermal stress, the pause time can be shorter even in the event of a discharge when the HV battery is not disconnected ("activating against the battery"), which has a positive effect on the necessary performance in the actual discharge process.

For this purpose, the frequency and the pulse duty factor of the pulse width modulated signal at the beginning of the active discharge are selected such that the semiconductor switch is closed for no longer than 5 µs. For this purpose, the frequency and the pulse duty factor of the pulse width modulated signal at the beginning of the active discharge are selected such that the semiconductor switch is closed for no longer than 1 µs.

In one embodiment of the device, the frequency of the pulse width modulated signal is in the range from 10 to 1000 Hz. In another embodiment, the frequency of the pulse width modulated signal is in the range from 50 to 200 Hz, for example 100 Hz.

In one embodiment of the device, the discharge resistor consists of a single SMD resistor.

In one embodiment of the device, the pulse width modulated signal is provided by a microcontroller. The PWM signal can be implemented without additional hardware expenditure by the microcontroller (µC) in the system and made available at an I/O pin of the µC.

The subject matter of the invention is also a method for actively discharging a high-voltage intermediate circuit contained in a power electronics module for providing an operating voltage for an electric drive machine of an electrically powered vehicle with an intermediate circuit capacitor via a circuit for actively discharging the high-voltage intermediate circuit, which circuit comprises a semiconductor switch and a discharge resistor made up of an SMD resistor or multiple SMD resistors connected in series thereto, in which the semiconductor switch is actuated during the active discharge with a pulse width modulated signal, characterized in that the frequency and the pulse duty factor of the pulse width modulated signal at the beginning of the active discharge are selected such that the semiconductor switch is closed for no longer than 10 µs, and the pulse duty factor of the signal is then increased depending on the current voltage level of the high-voltage intermediate circuit such that a power loss is generated at the discharge resistor over the duration of the active discharge, which comes as close as possible to a maximum permissible power loss of the discharge resistor but does not exceed it, and in that the power loss is distributed more evenly over the entire discharge period than with a constant pulse duty factor. In one embodiment of the method, the power loss at the discharge resistor during the active discharge is from 70 to 100% of the maximum permissible power loss of the discharge resistor, for example, from 80 to 100%, or even from 90 to 100%.

In one embodiment of the method, the frequency of the pulse width modulated signal is in the range from 10 Hz to 1000 Hz, for example 100 Hz.

In one embodiment of the method, the high-voltage intermediate circuit is discharged to a voltage of less than 60 V within a maximum of 2 s.

The solution according to the invention enables a briefly higher instantaneous power at the discharge resistor, wherein the brief overload capacity of the SMD resistors is used. Thermal inertia prevents overheating in the case of high-frequency power pulses. The result is constant heating without significant heating-up within the pulse time and cooling in the pause times.

Another advantage is the optimal use of space and components over the entire discharging process. The demands on the performance of the discharge circuit are lower, so only a smaller discharge network is required. Exclusive SMD equipment of the discharge circuit is possible, such that no selective wave soldering process is necessary, as is the case if THT components are used as discharge resistors and these represent the only THT components on the circuit board. Further advantages and embodiments of the invention will be apparent from the description.

It will be appreciated that the above-mentioned features and the features still to be explained hereinafter are usable not only in the particular specified combination but also in other combinations or alone, without leaving the scope of the present invention.

DETAILED DESCRIPTION

Figure 1:
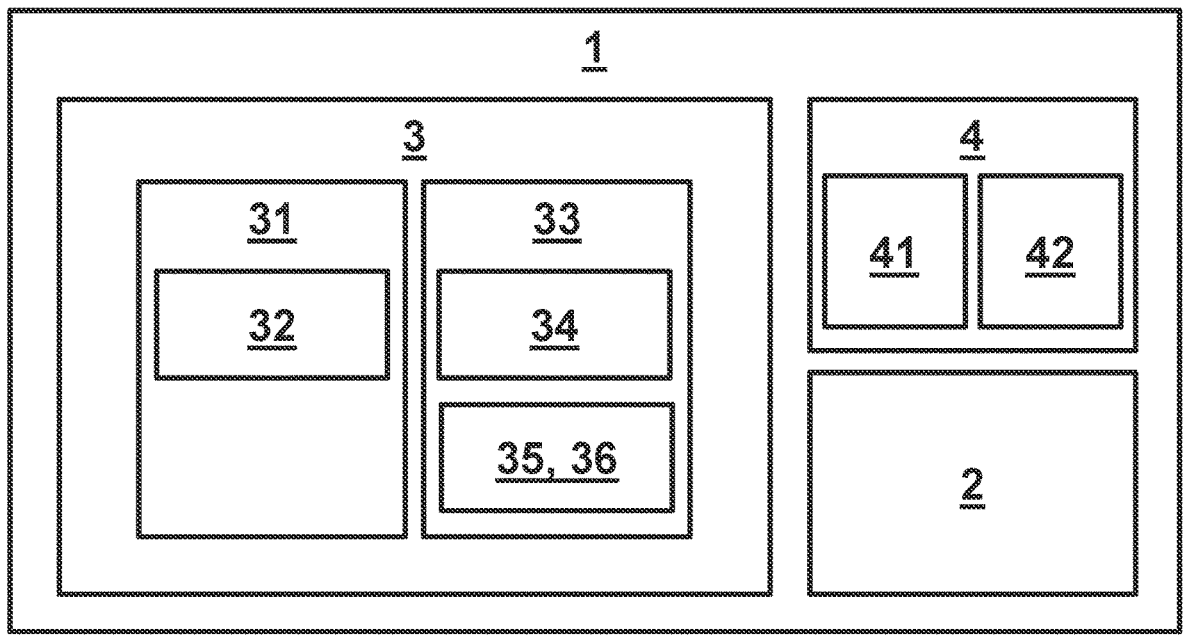
FIG. 1 An exemplary embodiment of the device according to the present invention.

In FIG. 1, a schematic diagram is depicted showing an electric vehicle 1 which comprises a drive machine 2, discharge device 3, and a power electronics module 4. The discharge device 3 is provided for actively discharging a high-voltage intermediate circuit 41 having an intermediate circuit capacitor 42 contained within the power electronics module 4. The discharge device 3 comprises control device 31 for controlling the active discharge and discharge circuit 33. Control device 31 may comprise a microcontroller 32. Discharge circuit 33 comprises semiconductor switch 34 and discharge resistor 35. Discharge resistor 35 may be embodied by one or more SMD resistors 36. Control device 31 may actuate semiconductor switch 34 with a pulse modulated signal, and can vary the pulse duty factor of the signal as well as its frequency. The pulse width modulated signal may optionally be provided by microcontroller 32.

Figure 2:
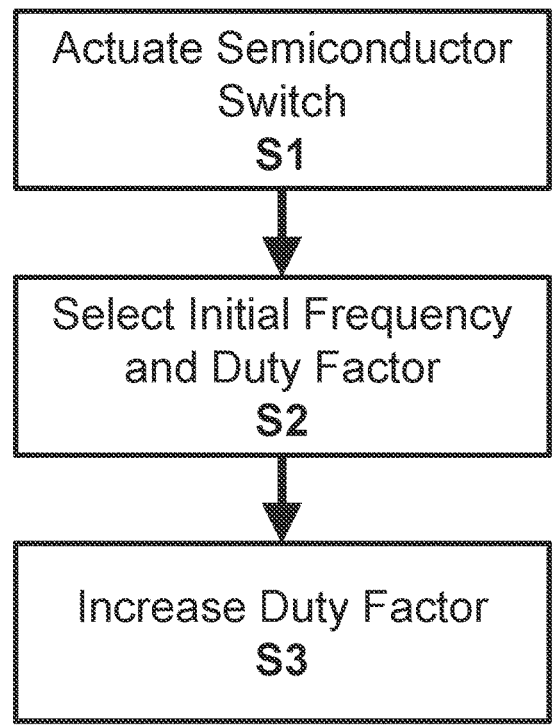
FIG. 2 An exemplary embodiment of the method according to the present invention.

In FIG. 2, an exemplary process by which the active discharge is carried out is shown. During an active discharge, the semiconductor switch 34 is actuated S1 to provide a pulse width modulated signal. An initial frequency and pulse duty factor of the signal is selected S2 to ensure that the semiconductor switch 34 is closed for no longer than a predetermined amount of time. The pulse duty factor of the signal may then be increased S3 depending on the voltage level of the intermediate circuit 41. The duty factor is increased to come as close as possible to a maximum permissible power loss of the discharge resistor 35.

The invention claimed is:

1. A device for actively discharging a high-voltage intermediate circuit for providing an operating voltage for an electric drive machine of an electrically powered vehicle, the high-voltage intermediate circuit contained in a power electronics module and provided with an intermediate circuit capacitor, the device comprising:
a control device for controlling an active discharge, and a discharge circuit that is actuated by the control device for actively discharging the high-voltage intermediate circuit,
wherein the high-voltage intermediate circuit further comprises a semiconductor switch and a discharge resistor connected in series thereto, such that the discharge resistor comprises at least one SMD resistor,
wherein the control device is configured to actuate the semiconductor switch with a pulse width modulated signal for the active discharge,
wherein a frequency and a pulse duty factor of the pulse width modulated signal at a beginning of the active discharge are selected such that the semiconductor switch is closed for no longer than 10 μs,
wherein both the frequency and the pulse duty factor of the signal are then varied as a function of an instantaneous voltage level of the high-voltage intermediate circuit to generate a power loss at the discharge resistor over a duration of the active discharge, the power loss falling between 70% and 100% of a maximum permissible power loss of the discharge resistor, and
wherein the duty factor of the signal is increased as the instantaneous voltage level decreases.

2. The device according to claim 1, wherein the frequency and the pulse duty factor of the pulse width modulated signal at the beginning of the active discharge are selected such that the semiconductor switch is closed for no longer than 5 μs.

3. The device according to claim 2, wherein the frequency and the pulse duty factor of the pulse width modulated signal at the beginning of the active discharge are selected such that the semiconductor switch is closed for no longer than 1 μs.

4. The device according to claim 1, wherein the frequency of the pulse width modulated signal ranges from 10 to 1000 Hz.

5. The device according to claim 4, wherein the frequency of the pulse width modulated signal ranges from 50 to 200 Hz.

6. The device according to claim 1, wherein the at least one SMD resistor is a single resistor.

7. The device according to claim 1, wherein the pulse width modulated signal is provided by a microcontroller.

8. A method for actively discharging a high-voltage intermediate circuit for providing an operating voltage for an electric drive machine of an electrically powered vehicle, the high-voltage intermediate circuit contained in a power electronics module and provided with an intermediate circuit capacitor via a circuit for actively discharging the high-voltage intermediate circuit, a semiconductor switch, and a discharge resistor comprising at least one SMD resistor connected in series thereto, the method comprising:
actuating the semiconductor switch during an active discharge with a pulse width modulated signal,
wherein a frequency and a pulse duty factor of the pulse width modulated signal at a beginning of the active discharge are selected such that the semiconductor switch is closed for no longer than 10 μs,
wherein both the frequency and the pulse duty factor of the signal are then varied as a function of an instantaneous voltage level of the high-voltage intermediate circuit to generate a power loss at the discharge resistor over a duration of the active discharge, the power loss falling between 70% and 100% of a maximum permissible power loss of the discharge resistor, and
wherein the duty factor of the signal is increased as the instantaneous voltage level decreases.

9. The method according to claim 8, wherein the frequency of the pulse width modulated signal ranges from 10 to 1000 Hz.

10. The method according to claim 8, wherein the high-voltage intermediate circuit is discharged to a voltage of less than 60 V within a maximum of 2 seconds.

11. The device according to claim 2, wherein the frequency of the pulse width modulated signal is in the range from 10 to 1000 Hz.

12. The device according to claim 11, wherein the frequency of the pulse width modulated signal is in the range from 50 to 200 Hz.

13. The device according to claim 2, wherein the at least one SMD resistor is a single resistor.

14. The device according to claim 3, wherein the at least one SMD resistor is a single resistor.

15. The device according to claim 4, wherein the at least one SMD resistor is a single resistor.

16. The device according to claim 5, wherein the at least one SMD resistor is a single resistor.

17. The device according to claim 2, wherein the pulse width modulated signal is provided by a microcontroller.

18. The device according to claim 3, wherein the pulse width modulated signal is provided by a microcontroller.

19. The device according to claim 1, wherein the control device is configured to accommodate the active discharge while a high voltage battery of the electrically powered vehicle is still connected to the high-voltage intermediate circuit for at least part of the active discharge.

20. The method according to claim 8, wherein, for at least part of the active discharge, a high voltage battery of the electrically powered vehicle is still connected to the high-voltage intermediate circuit.

* * * * *